(12) United States Patent
Baiddou et al.

(10) Patent No.: US 12,434,552 B2
(45) Date of Patent: Oct. 7, 2025

(54) TANK FOR A WORK VEHICLE

(71) Applicant: KUBOTA CORPORATION, Osaka (JP)

(72) Inventors: Omar Baiddou, Crepy-en-Valois (FR); Toshihide Shimizu, Crepy-en-Valois (FR); Masatoshi Iwamoto, Crepy-en-Valois (FR)

( * ) Notice: Subject to any disclaimer, the term of this patent is extended or adjusted under 35 U.S.C. 154(b) by 151 days.

(21) Appl. No.: 18/227,330

(22) Filed: Jul. 28, 2023

(65) Prior Publication Data
US 2024/0262188 A1    Aug. 8, 2024

(30) Foreign Application Priority Data
Feb. 8, 2023    (EP) .................................... 23305167

(51) Int. Cl.
*B60K 15/03*    (2006.01)
*B60K 15/077*    (2006.01)

(52) U.S. Cl.
CPC .......... *B60K 15/03* (2013.01); *B60K 15/077* (2013.01); *B60K 2015/03144* (2013.01); *B60K 2015/03151* (2013.01); *B60K 2015/03157* (2013.01)

(58) Field of Classification Search
CPC ........... B60K 2015/03118; B60K 2015/03348; B60K 2015/03355; B60K 2015/03151
See application file for complete search history.

(56) References Cited

U.S. PATENT DOCUMENTS

| | | | |
|---|---|---|---|
| 9,556,772 B2 * | 1/2017 | Mitobe | F01N 3/0842 |
| 11,007,869 B2 * | 5/2021 | Kurokawa | B60K 15/063 |
| 2018/0038075 A1 | 2/2018 | Yamada | |
| 2020/0298698 A1 * | 9/2020 | Hayashi | B60K 15/077 |

FOREIGN PATENT DOCUMENTS

| | | | | |
|---|---|---|---|---|
| CN | 106314132 B | * | 6/2019 | ............ B60K 15/03 |
| CN | 214063182 U | * | 8/2021 | |
| EP | 2017113 A1 | | 1/2009 | |
| JP | 2011063988 A | * | 3/2011 | |
| WO | 2009/131561 A1 | | 10/2009 | |

OTHER PUBLICATIONS

Translation: Qiu Y, CN-106314132-B; (Year: 2019).*
Translation: He J, CN-214063182-U (Year: 2021).*
Translation: Yamashita K, JP-2011063988-A (Year: 2011).*
English language abstract of CN 106314132.

* cited by examiner

*Primary Examiner* — Mollie Impink
(74) *Attorney, Agent, or Firm* — Cabinet Beau De Lomenie

(57) ABSTRACT

A tank arrangement, wherein the fuel tank body comprising a main portion and a secondary portion which comprises an upper portion and an intermediate portion arranged successively along the vertical direction, configured to define a housing to accommodate the urea tank, wherein in an engaged configuration, the urea tank is arranged under the upper portion of the secondary portion along the vertical direction, in abutment on the intermediate portion along the transverse direction, and in abutment on the primary portion along the front-rear direction, wherein the urea tank comprises a urea drain on a lower portion of the urea tank along the vertical direction, the secondary portion of the fuel tank comprises a groove that extends through the fuel tank along the transverse direction, adapted to allow ducts to go through the secondary portion of the fuel tank along the transverse direction to be connected to the urea tank.

14 Claims, 6 Drawing Sheets

TANK FOR A WORK VEHICLE

CROSS REFERENCE TO RELATED APPLICATION

This application claims the benefit of European Patent Application No. 23 305 167.1, filed Feb. 8, 2023, which is incorporated by reference in its entirety.

TECHNICAL FIELD

The present disclosure relates to a tank for an agricultural engine such as a tractor.

BACKGROUND

Work vehicles such as tractors usually present a fuel tank assembly which comprises a fuel tank and a urea tank. These two tanks are distinct and in conventional configurations, the fuel tank comprises a lower portion which forms a basis, and an upper portion of reduced width. The urea tank is then arranged side by side with the fuel tank. Such a configuration is conventionally used to ensure an easy filling of both tanks. However, issues can occur when emptying the urea tank after use, as the flow is limited by the arrangement of the urea tank and the fuel tank.

In addition, operators tend to store a toolbox above these two tanks, which interferes with front loaders often used in work vehicles.

SUMMARY

The present disclosure aims at providing a solution these technical issues.

The present disclosure relates to a tank arrangement comprising a fuel tank and a urea tank. The tank arrangement presents a front-rear direction, a transverse direction and a vertical direction. The fuel tank comprises a fuel tank body, the tank body comprises a main portion and a secondary portion, wherein the secondary portion comprises an upper portion and an intermediate portion arranged successively along the vertical direction, configured so as to define a housing to accommodate the urea tank. The urea tank can be inserted into an engaged configuration within the housing from a front face of the fuel tank along the transverse direction. In the engaged configuration, the urea tank is arranged under the upper portion of the secondary portion along the vertical direction, in abutment on the intermediate portion along the transverse direction, and in abutment on the primary portion along the front-rear direction. The urea tank comprises a urea drain on a lower portion of the urea tank along the vertical direction. The secondary portion of the fuel tank comprises a groove that extends through the fuel tank along the transverse direction that is adapted to allow ducts to go through the secondary portion of the fuel tank along the transverse direction to be connected to the urea tank.

In an example, the urea tank comprises a urea drain on a lower portion of the urea tank along the vertical direction, the tank arrangement is configured such that so that fluid flowing from the urea drain can be discharged along the vertical direction without flowing on the tank arrangement.

In an example, the tank arrangement further comprises a tank support arranged below the fuel tank and the urea tank along the vertical direction, wherein the tank support is provided with a notch, such that the urea drain is in front of the notch when the urea tank is in the engaged configuration within the fuel tank.

In an example, the notch extends from a front face of the tank support of the fuel tank.

In an example, the notch and the urea drain are arranged so that fluid flowing from the urea drain can be discharged without flowing on the tank support.

In an example, the secondary portion of the fuel tank comprises a base portion, formed such that in the engaged configuration, the urea tank is arranged between the base portion and the upper portion along the vertical direction, wherein the base portion of the fuel tank is provided with a notch, such that the urea drain is in front of the notch when the urea tank is in the engaged configuration within the fuel tank.

In an example, the notch extends from a front face of the base portion of the fuel tank, and extends through the base portion along the vertical direction.

In an example, the notch and the urea drain are arranged so that fluid flowing from the urea drain can be discharged without flowing on the base portion of the fuel tank.

In an example, the tank support comprises lateral abutments, adapted to form an abutment along the rear-front direction.

In an example, the urea tank comprises a urea inlet on an upper face of the urea tank, the urea inlet is configured to be connected to ducts and/or lines through the through hole formed on the secondary portion of the fuel tank.

In an example, the upper portion of the fuel tank presents a recess adapted to house a toolbox.

In an example, the recess is configured so that a toolbox inserted in the recess does not protrude over the upper portion of the fuel tank along the vertical direction.

In an example, the tank arrangement further comprises a lock adapted to immobilize the urea tank in the engaged configuration within the housing of the fuel tank.

In an example, the intermediate portion of the fuel tank presents a shoulder portion and the urea tank presents a stepped portion adapted to fit under the shoulder portion in the engaged configuration.

In an example, the fuel tank and the urea tank comprise guiding means adapted to guide the insertion of the urea tank within the housing defined by the fuel tank.

BRIEF DESCRIPTION OF THE DRAWINGS

The disclosure and its advantages will be better understood upon reading the detailed description made hereafter of different embodiments of the disclosure, given by way of non-limiting examples. This description makes reference to the pages of appended drawings, in which.

In all the figures, similar elements are designated by identical numerical references.

DETAILED DESCRIPTION

Figure 1:
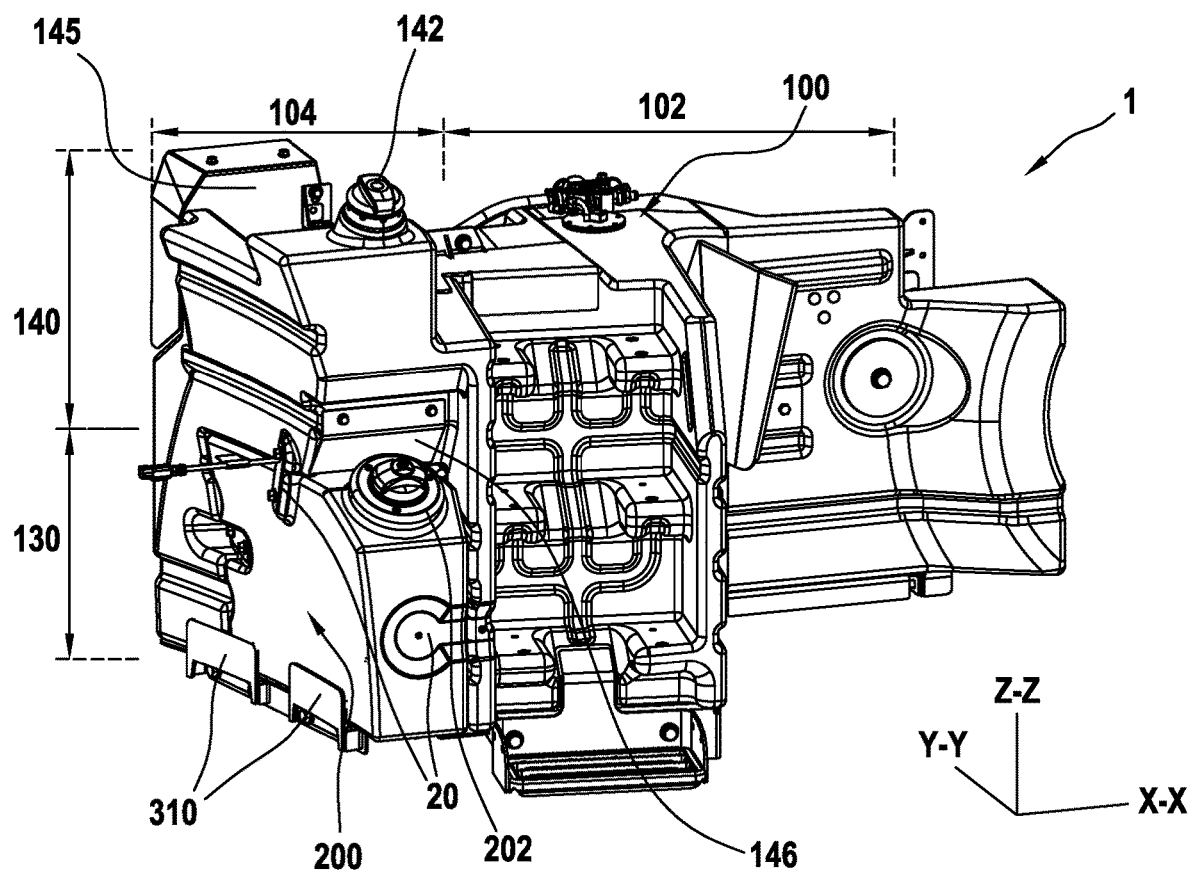
FIG. 1 presents a schematic drawing of a first embodiment of the disclosure.
Figure 2:
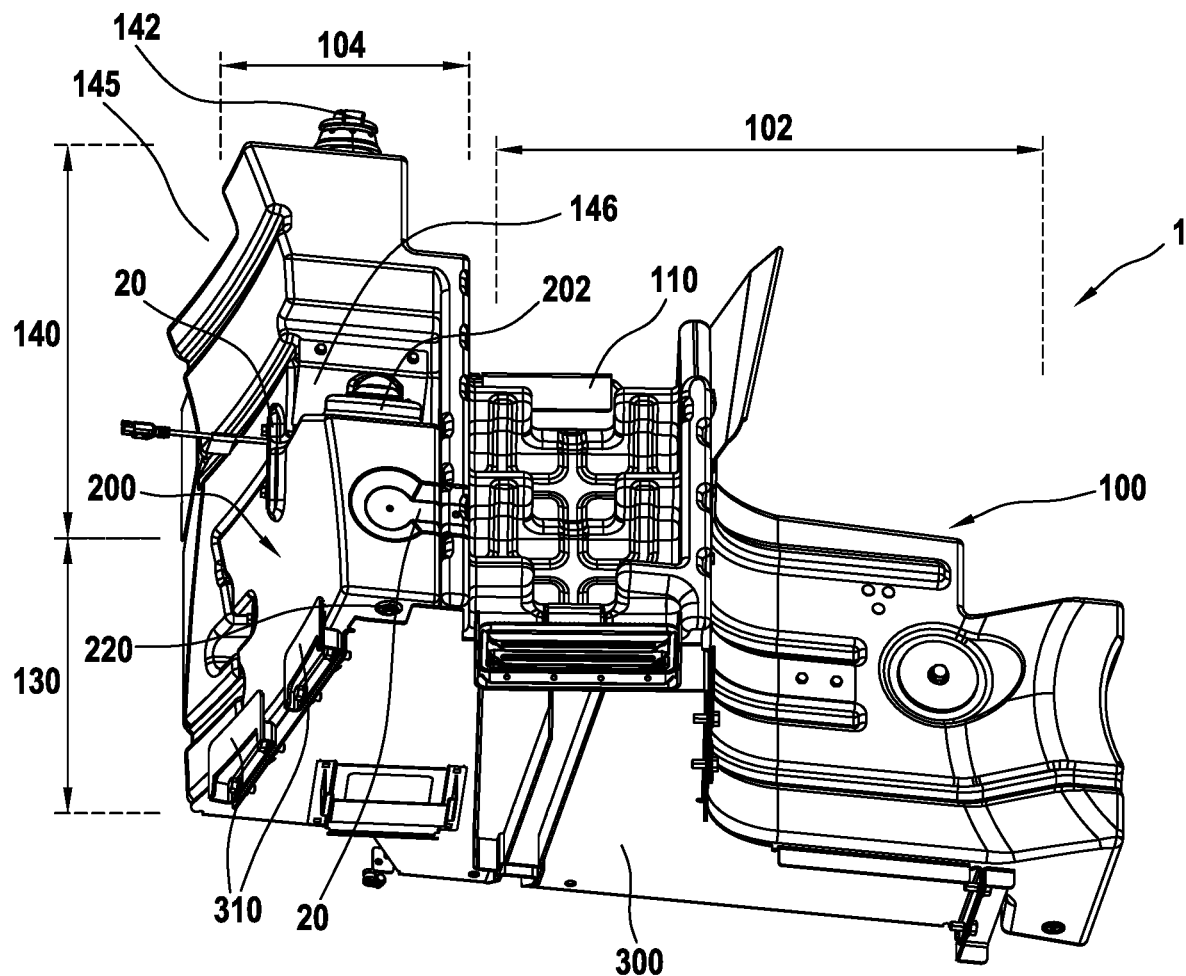
FIG. 2 presents another view of the first embodiment of the present disclosure.
Figure 3:
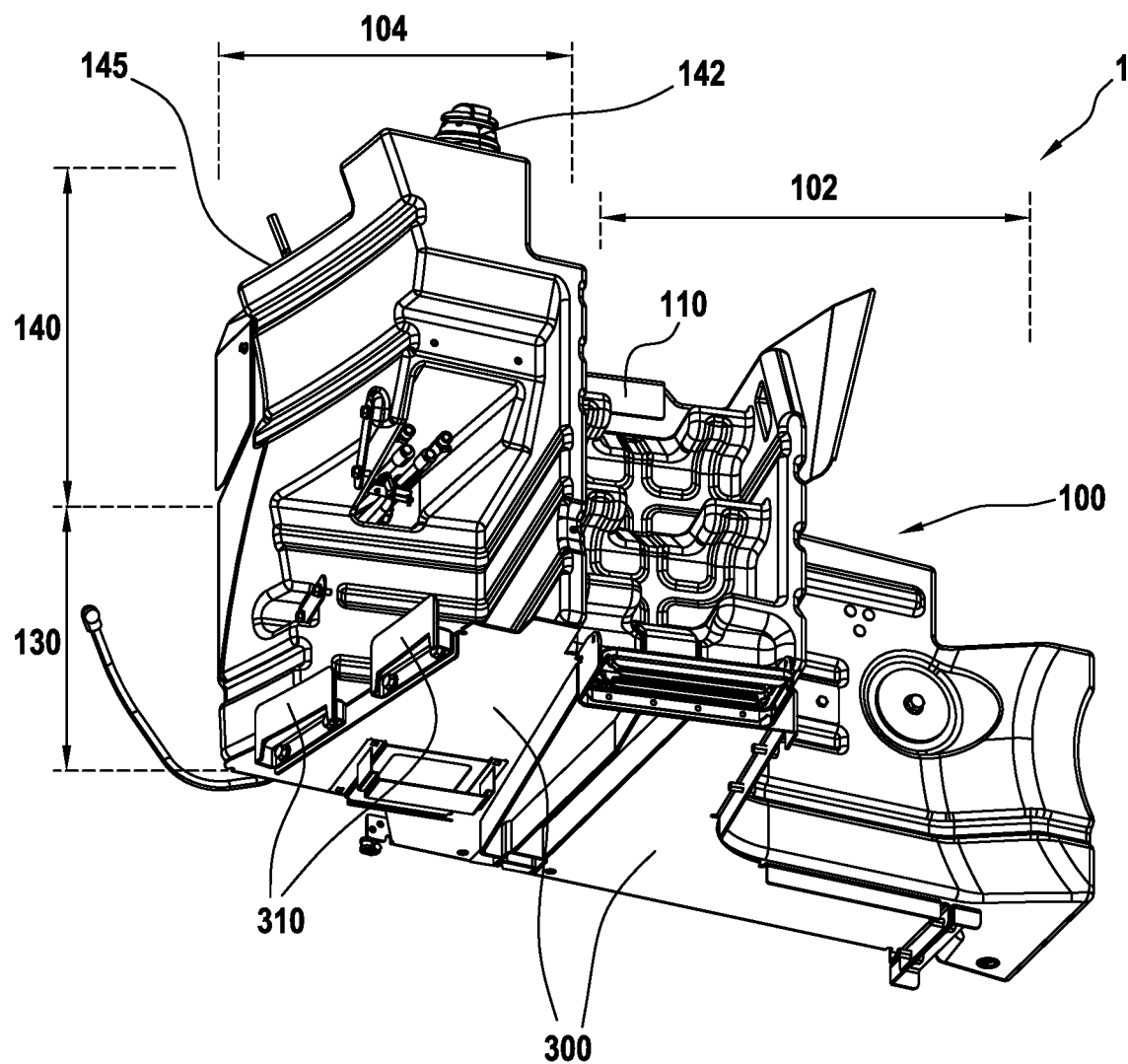
FIG. 3 presents another view of the first embodiment of the present disclosure, where the urea tank has been removed.
Figure 4:
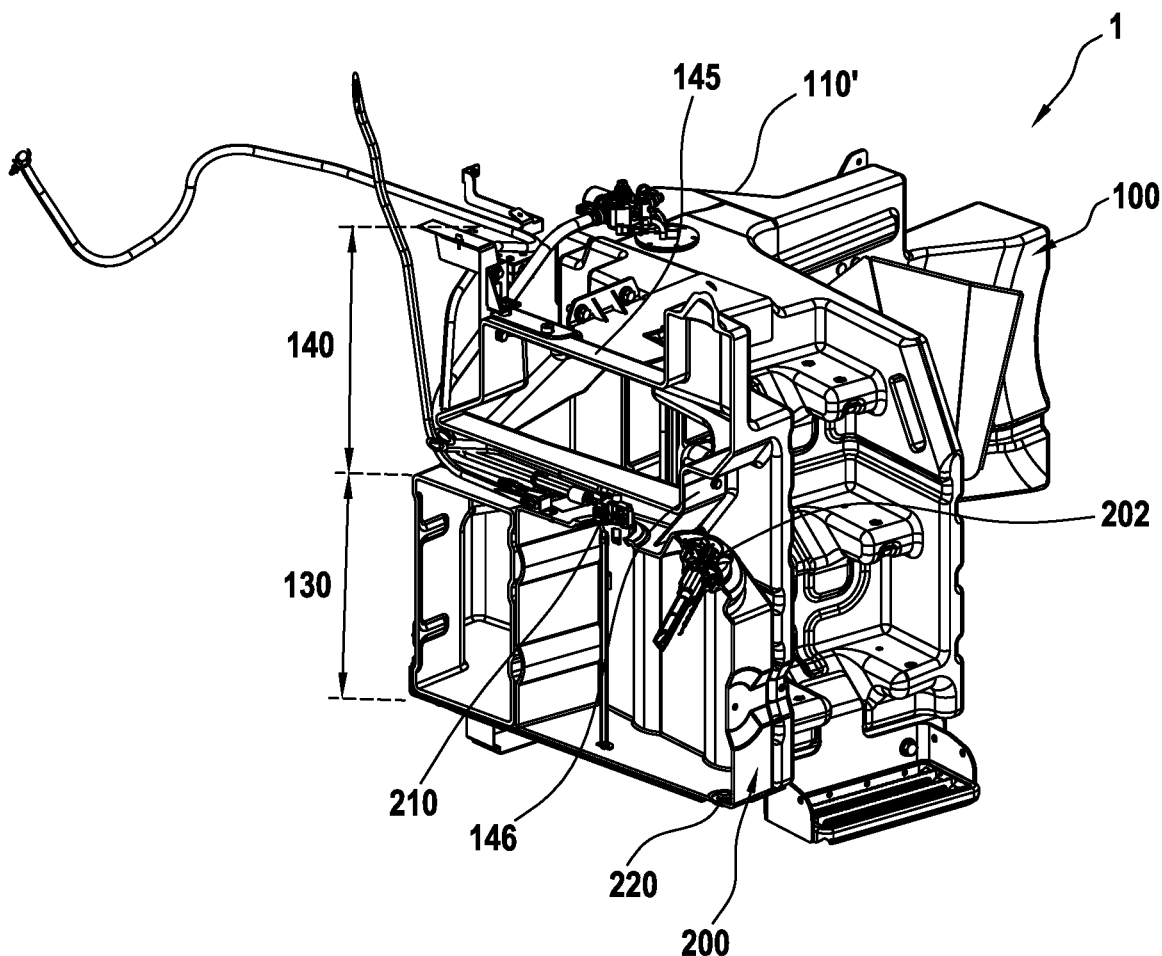
FIG. 4 presents a cross-section view of the first embodiment of the present disclosure, along a plane that goes through the middle of the urea tank.

A first example embodiment of the present disclosure will then be described with reference to FIGS. 1 to 4.

FIGS. 1 to 4 present a tank arrangement 1 for a work vehicle according to an example embodiment of the present disclosure. This tank arrangement can for instance be implemented on a work vehicle such as a tractor, or more generally on an agricultural engine.

The tank arrangement 1 as presented comprises a fuel tank 100 and a urea tank 200, that are distinct from each other.

The fuel tank 100 as presented comprises a fuel tank body 110 which presents a main portion 102 and a secondary portion 104.

The secondary portion 104 comprises an upper portion and an intermediate portion 130 140, that are arranged successively from a top to a bottom along a vertical direction.

The fuel tank body 110 presents an inner volume adapted to store fuel. The fuel tank body extends along a main direction X-X which is defined as corresponding to a front-rear direction for a work vehicle. A vertical direction is defined as the vertical axis Z-Z, and a width direction Y-Y is defined as perpendicular to both the vertical direction Z-Z and the main direction X-X. A front face of the fuel tank 100 is defined along the width direction, which is designed to be the face of the fuel tank that faces an exterior side of the work vehicle. In the illustrated embodiment, the main portion 102 and the secondary portion 104 are arranged successively along the main direction X-X.

For instance, when implemented on a tractor, the tank arrangement 1 is typically arranged in a midway portion of a main body of the tractor, between the engine compartment and the tractor cab, so that the main direction X-X of the fuel tank body corresponds to the front-rear direction of the tractor, the width direction Y-Y corresponds to the transverse direction of the tractor; and the front face of the fuel tank 100 protrudes from a lateral side of the tractor. The fuel tank body 110 is provided with a fuel inlet 142 on its front face or on an upper face, typically on the front face or on an upper face of the upper portion 140, the fuel inlet is adapted to enable to fill the fuel tank 100 with fuel.

The secondary portion 104 of the fuel tank body 110 is configured so as to define a housing adapted to receive the urea tank 200. The housing is typically defined by the intermediate portion 130.

To define the housing, the fuel tank body 110 is typically defined such that the intermediate portion presents a recess defining the housing adapted to accommodate the urea tank 200. The housing opens on the front face of the fuel tank 100. The housing is defined such that the urea tank can be inserted below the upper portion 140 along the vertical direction Z-Z, in front of the intermediate portion 130 along the width direction Y-Y, and side-by-side with the main portion 102 of the fuel tank 100 along the main direction X-X.

The urea tank 200 is adapted to be inserted within the housing defined by the fuel tank 100, typically by sliding along the width direction of the fuel tank 100, from the front face of the fuel tank 100. The urea tank 200 can therefore be engaged within the housing of the fuel tank 100. In the following description we will refer to an engaged configuration of the urea tank 200 within the fuel tank 100 as a configuration where the urea tank 200 is fully engaged within the housing of the fuel tank 100, i.e. the urea tank 200 abuts against the intermediate portion 130 of the fuel tank 100 along the width direction Y-Y.

The fuel tank 100 typically comprising guiding means adapted to guide the displacement of the urea tank 200 within the housing provided by the fuel tank 100.

The urea tank 200 presents a shape that is adapted to be engaged within the housing provided by the fuel tank 100. The shape of the urea tank 200 is typically complementary to the shape of the housing defined by the fuel tank 100. The shape represented in the figures is however only meant to be an example embodiment, and should not be interpreted as limiting the scope of the present disclosure.

The urea tank 200 typically presents a urea inlet provided in a top portion of a front face of the urea tank 200. In the illustrated embodiment, the urea inlet 202 is provided on a biased portion between a front face and a top face of the urea tank. The urea inlet 202 is adapted to enable the filling of the urea tank 200.

The urea tank 200 is provided with plug assembly 210 which is here provided on the top face of the urea tank 200, this plug assembly 210 is configured to connect the urea tank 200 to a control unit and to an engine of the work vehicle.

The upper portion 140 of the fuel tank 100 is typically provided with a groove 144 to accommodate the plug assembly 210 when the urea tank 200 is inserted within the housing of the fuel tank 100, and to accommodate connectors adapted to be connected to the plug assembly 210. The groove 144 extends through the width of the fuel tank 100 along the width direction Y-Y so as to define a through hole. Ducts, piles and connectors can then extend through the fuel tank 100 to be connected to the plug assembly 210 of the urea tank 200. A groove cover 146 can be arranged on an outer lateral side of the groove 144, so as to protect the plug assembly 210 and the various ducts and pipes arranged within the groove 144 from outer elements and projections. The groove cover 146 as illustrated is formed so as to cover the groove 144 while being located behind the urea inlet 202.

The tank arrangement 1 is typically provided with a lock 20, adapted to lock the urea tank 200 in position within the housing of the fuel tank 100 when the urea tank 200 is in the engaged configuration. In the illustrated embodiment, the lock 20 is provided on the front face of the urea tank 200 and on the front face of the fuel tank 100. This embodiment is only meant as an example, and one can understand that the lock 20 can be located in any appropriate location that can be easily reached by an operator, and that the tank arrangement 1 can be provided with one or more of such locks 20 that can be identical or distinct. In the illustrated embodiment, the lock 20 comprises tabs that are assembled to both the fuel tank 100 and the urea tank 200 with engaging means such as screws.

The urea tank 200 is provided with a drain 220, arranged on a bottom side of the urea tank 200. The drain 220 is adapted to enable an operator to empty the contents of the urea tank 200.

The drain 220 is typically arranged proximal to the front face of the urea tank 200, so as to be easily reachable by an operator. According to an example embodiment, the drain 220 is located within 20 cm of the front face of the urea tank 200, or typically within 10 cm of the front face of the urea tank 200.

In the embodiment disclosed in FIGS. 1 to 4, a tank support 300 is provided under the tank arrangement 1 along the vertical direction Z-Z.

The tank arrangement 1 is therefore supported by the tank support 300.

The tank support 300 is provided with a notch 322 formed so that the urea drain 220 is in front of the notch 322 when the urea tank is in the engaged configuration within the housing defined by the fuel tank 100. The notch 322 extends through the whole thickness of the tank support 300 along the vertical direction Z-Z, such that when urea flows from the drain 220, urea can flow through the fuel tank 100 without coming in contact with tank support 300. In other words, urea can be directly discharged from the drain 220 of the urea tank 200 to the ground or to a receptacle without flowing on the tank support 300. Such a configuration enables to increase the flow and therefore speed up the draining operation of the urea tank 200 while the urea tank 200 remains engaged within the housing of the fuel tank 100.

In the illustrated embodiment, the tank support 300 comprises lateral abutments 310, adapted to form an abutment along the rear-front direction X-X. The abutments 310 are adapted to prevent the tank arrangement 1 to move forward along the rear-front direction X-X for instance in case of a sudden stop of a work vehicle. Similar abutments can also be provided to prevent a backward displacement along the rear-front direction X-X in case of sudden acceleration. In other words, the tank support 300 can comprise abutments adapted to prevent the displacement of the tank arrangement 1 along the main direction X-X, i.e. the front-rear direction X-X.

In an embodiment, the upper portion 140 of the fuel tank 100 presents a recess 145 adapted to house a toolbox. This recess 145 is configured so that a toolbox can be fit within, while a top portion of the toolbox will not protrude from the upper portion 140 of the fuel tank 100 along the vertical direction Z-Z.

Such a configuration enables to house a toolbox while preventing a potential interference with implements of the work vehicle such as a front loader. In addition, the position of the toolbox is lowered, which enables to increase the visibility for the driver.

Further, the toolbox can be maintained in position by the shape of the recess 145, and can be directly opened by an operator without having to remove it from the recess 145, which facilitated the use of the toolbox.

Figure 5:
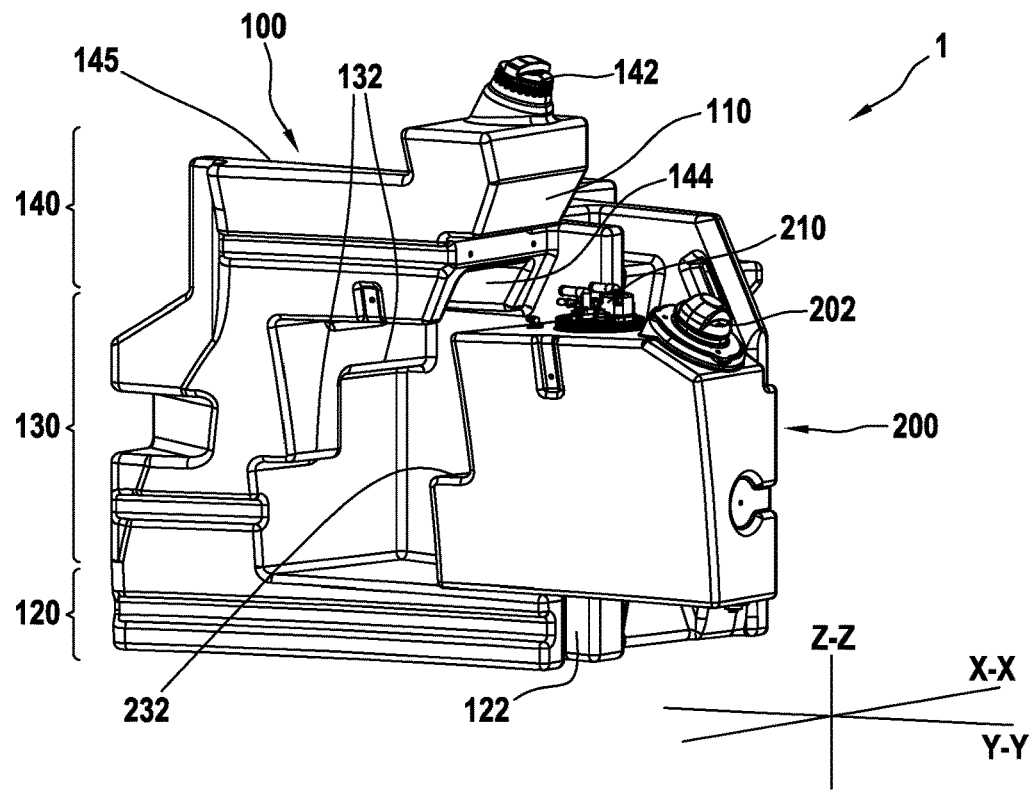
FIG. 5 presents a schematic drawing of a second embodiment of the disclosure.
Figure 6:
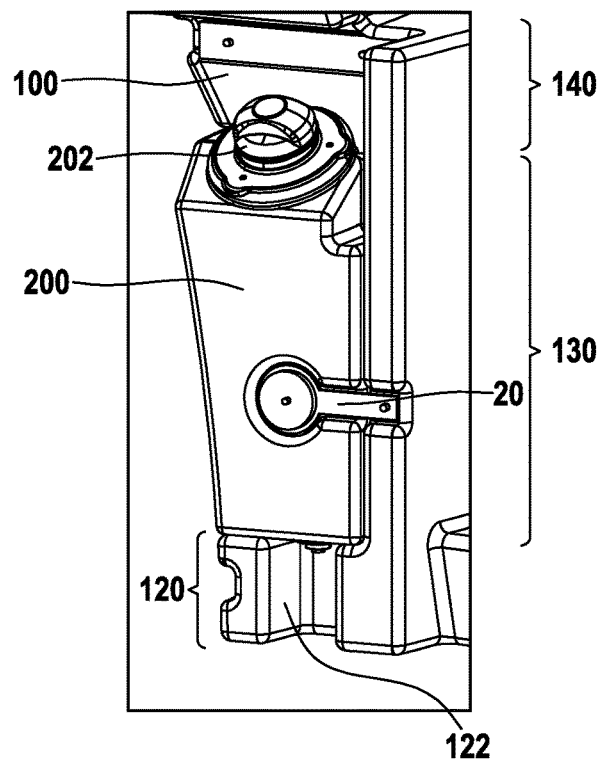
FIG. 6 presents another view of the second embodiment of the present disclosure.
Figure 7:
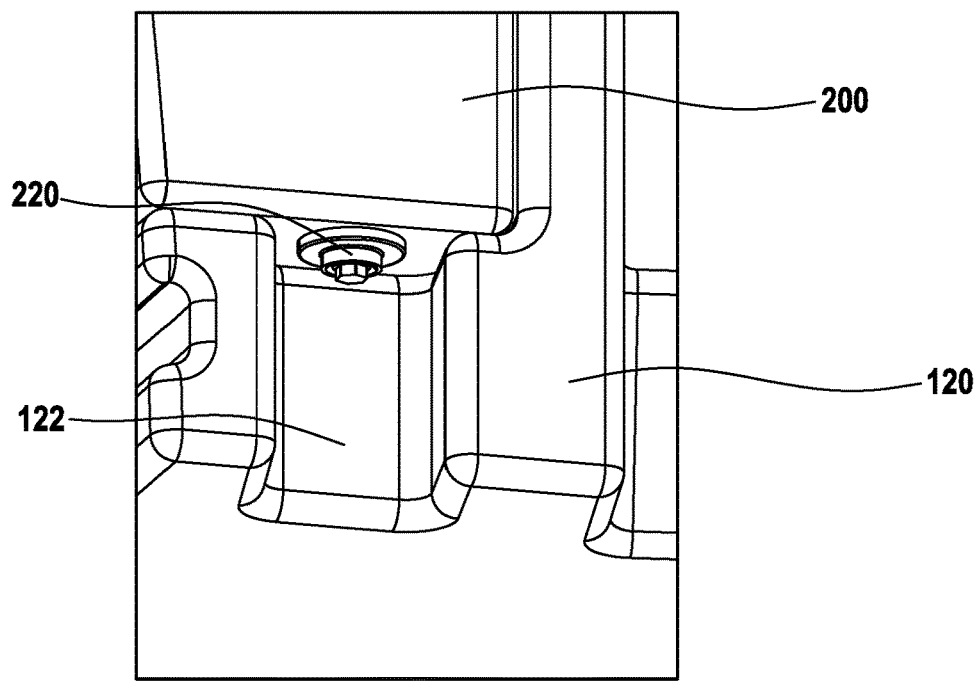
FIG. 7 presents another view of the second embodiment of the present disclosure.
Figure 8:
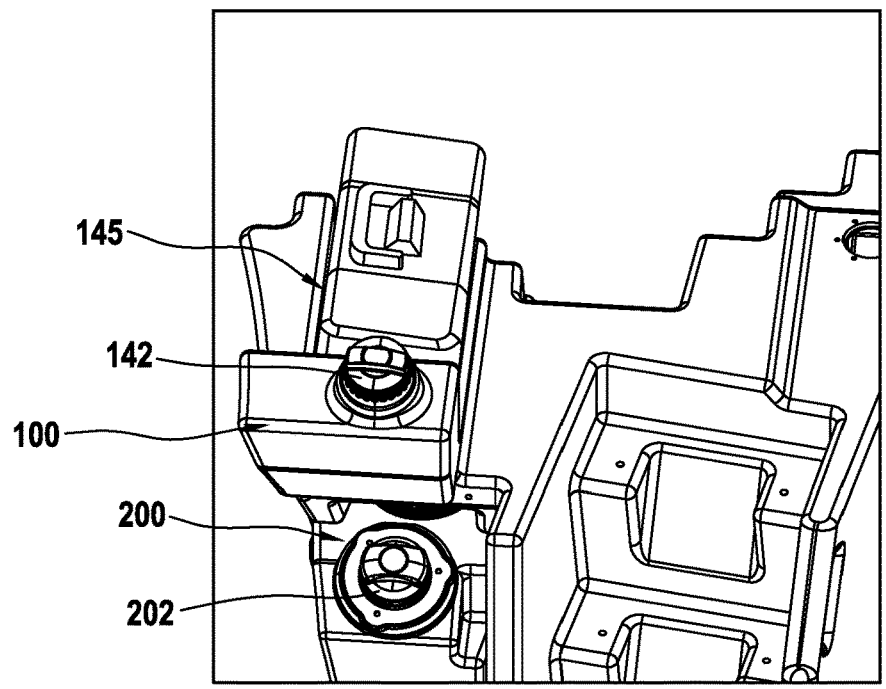
FIG. 8 presents another view of the second embodiment of the present disclosure.

A second embodiment is then described with reference to FIGS. 5 to 8. Only the distinguishing features between the two embodiments will be detailed hereafter.

In this embodiment, the secondary portion 104 of the fuel tank 100 comprises a base portion 120 formed under the intermediate portion 130 along the vertical direction Z-Z.

In this embodiment, the housing to accommodate the urea tank 200 is therefore defined between the base portion 120 and the upper portion 140 along the vertical direction Z-Z. The base portion 120 is arranged on and supported by the tank support 300.

In this embodiment, the base portion 120 of the fuel tank 100 is provided with a notch 122 adapted to be in line with the drain 220 and with the notch 322 formed in the tank support 300 when the urea tank 200 is engaged within the housing of the fuel tank 100.

The notch 122 extends through the whole thickness of the base portion 120 of the fuel tank 100 along the vertical direction Z-Z, such that when urea flows from the drain 220, urea can flow through the fuel tank 100 without coming in contact with the fuel tank 100, or more precisely in contact with the base portion 120 of the fuel tank 100, nor with the tank support 300. In other words, urea can be directly discharged from the drain 220 of the urea tank 200 to the ground or to a receptacle without flowing on the fuel tank 100 or on the tank support 300. Such a configuration enables to increase the flow and therefore speed up the draining operation of the urea tank 200 while the urea tank 200 remains engaged within the housing of the fuel tank 100.

In the embodiment disclosed, the intermediate portion 130 of the fuel tank 100 defines two shoulder portions 132 arranged at two different heights. The urea tank 200 comprises two corresponding stepped portions 232, adapted to fit under the shoulder portions 130 of the fuel tank 100 when the urea tank 200 is engaged in the housing. This configuration ensures a proper maintain of the urea tank 200 and prevents it from tilting towards the opening of the housing.

The embodiments disclosed enable to provide an improved tank arrangement 1 which ensure a proper holding of the urea tank 200 while maximizing the volume of the fuel tank 100. In addition, the various inlets and outlets of the urea tank 200 can be easily reached so as to ensure a proper connection of the urea tank, and allow an easy filling and draining of the urea tank 200.

Although the present disclosure has been described with reference to specific exemplary embodiments, it is obvious that modifications and changes can be carried out on these examples with departing from the general scope of the disclosure as defined by the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a device, and conversely, all the features described with reference to a device are transposable, alone or in combination, to a method.

What is claimed is:

1. A tank arrangement comprising a fuel tank and a urea tank, wherein the tank arrangement presents a main direction, a width direction and a vertical direction,
the fuel tank comprises a fuel tank body, the tank body comprising a main portion and a secondary portion,
wherein the secondary portion comprises an upper portion and an intermediate portion arranged successively along the vertical direction,
configured so as to define a housing to accommodate the urea tank,
the urea tank can be inserted into an engaged configuration within the housing from a front face of the fuel tank along the width direction,
wherein in the engaged configuration, the urea tank is arranged
under the upper portion of the secondary portion along the vertical direction,
in abutment on the intermediate portion along the transverse-width direction,
in abutment on the main portion along the main direction, the urea tank comprises a urea drain on a lower portion of the urea tank along the vertical direction,
the secondary portion of the fuel tank comprises a groove that extends through the fuel tank along the width direction, adapted to allow ducts to go through the secondary portion of the fuel tank along the width direction to be connected to the urea tank.

2. The tank arrangement of claim 1, wherein the tank arrangement is configured such that so that fluid flowing from the urea drain can be discharged along the vertical direction without flowing on the tank arrangement.

3. The tank arrangement of claim 1, which further comprises a tank support arranged below the fuel tank and the urea tank along the vertical direction, wherein the tank support is provided with a notch, such that the urea drain is in front of the notch when the urea tank is in the engaged configuration within the fuel tank.

4. The tank arrangement of claim 3, wherein the notch extends from a front face of the tank support of the fuel tank.

5. The tank arrangement of claim 3, wherein the notch and the urea drain are arranged so that fluid flowing from the urea drain can be discharged without flowing on the tank support.

6. The tank arrangement of claim 2, wherein the secondary portion of the fuel tank comprises a base portion, formed such that in the engaged configuration, the urea tank is arranged between the base portion and the upper portion along the vertical direction, wherein the base portion of the fuel tank is provided with a notch, such that the urea drain is in front of the notch when the urea tank is in the engaged configuration within the fuel tank.

7. The tank arrangement of claim 6, wherein the notch extends from a front face of the base portion of the fuel tank, and extends through the base portion along the vertical direction.

8. The tank arrangement of claim 6, wherein the notch and the urea drain are arranged so that fluid flowing from the urea drain can be discharged without flowing on the base portion of the fuel tank.

9. The tank arrangement of claim 6, wherein the tank support comprises lateral abutments, adapted to form an abutment along the main direction.

10. The tank arrangement of claim 1, wherein the urea tank comprises a urea inlet on an upper face of the urea tank, the urea inlet being configured to be connected to ducts and/or lines through the groove formed on the secondary portion of the fuel tank.

11. The tank arrangement of claim 1, wherein the upper portion of the fuel tank presents a recess adapted to house a toolbox.

12. The tank arrangement of claim 11, wherein the recess is configured so that a toolbox inserted in the recess does not protrude over the upper portion of the fuel tank along the vertical direction.

13. The tank arrangement of claim 1, which further comprises a lock adapted to immobilize the urea tank in the engaged configuration within the housing of the fuel tank.

14. The tank arrangement of claim 1, wherein the intermediate portion of the fuel tank presents a shoulder portion and the urea tank presents a stepped portion adapted to fit under the shoulder portion in the engaged configuration.

* * * * *